United States Patent
Harding

(10) Patent No.: US 7,283,613 B2
(45) Date of Patent: Oct. 16, 2007

(54) METHOD OF MEASURING THE MOMENTUM TRANSFER SPECTRUM OF ELASTICALLY SCATTERED X-RAY QUANTA

(75) Inventor: Geoffrey Harding, Hamburg (DE)

(73) Assignee: GE Homeland Protection, Inc., Newark, CA (US)

( * ) Notice: Subject to any disclaimer, the term of this patent is extended or adjusted under 35 U.S.C. 154(b) by 0 days.

(21) Appl. No.: 11/300,939

(22) Filed: Dec. 15, 2005

(65) Prior Publication Data

US 2006/0239406 A1    Oct. 26, 2006

(30) Foreign Application Priority Data

Dec. 16, 2004    (DE) ........................ 10 2004 060 609

(51) Int. Cl.
*G01N 23/201* (2006.01)
(52) U.S. Cl. .......................................... 378/86; 378/57
(58) Field of Classification Search ................... 378/57, 378/70, 71, 210, 82–88, 124, 119, 120, 147–149
See application file for complete search history.

(56) References Cited

U.S. PATENT DOCUMENTS

| | | | | |
|---|---|---|---|---|
| 5,008,911 A | * | 4/1991 | Harding | 378/86 |
| 5,265,144 A | * | 11/1993 | Harding et al. | 378/86 |
| 5,394,454 A | * | 2/1995 | Harding | 378/86 |
| 5,461,653 A | * | 10/1995 | Parker | 378/22 |
| 5,612,988 A | * | 3/1997 | Martens | 378/86 |
| 5,805,662 A | * | 9/1998 | Kurbatov et al. | 378/87 |
| 6,005,916 A | * | 12/1999 | Johnson et al. | 378/87 |
| 6,470,067 B1 | * | 10/2002 | Harding | 378/19 |
| 6,744,845 B2 | * | 6/2004 | Harding et al. | 378/16 |
| 6,895,071 B2 | * | 5/2005 | Yokhin et al. | 378/45 |
| 7,120,226 B2 | * | 10/2006 | Ledoux et al. | 378/57 |
| 2002/0150209 A1 | * | 10/2002 | Yokhin | 378/82 |
| 2003/0031295 A1 | * | 2/2003 | Harding | 378/86 |
| 2003/0091147 A1 | * | 5/2003 | Takata et al. | 378/71 |
| 2006/0140340 A1 | * | 6/2006 | Kravis | 378/57 |

* cited by examiner

*Primary Examiner*—Edward J. Glick
*Assistant Examiner*—Anastasia S. Midkiff
(74) *Attorney, Agent, or Firm*—Eugene Hyun, Esq.; Armstrong Teasdale LLP

(57) ABSTRACT

A method of measuring a momentum transfer spectrum of elastically scattered X-ray quanta which emanate from a scatter voxel inside an object to be examined is described. A scatter voxel emits X-radiation in an X-direction and has a primary collimator which allows through only primary radiation aimed at a single isocentre at the origin of a Cartesian coordinates system. The X-ray quanta are emitted at an angle of scatter ($\Theta$) with a constant Z-component ($\Theta_z$). The method includes simultaneous recording of the energy spectrum of scatter quanta from the scatter voxel at different angles of scatter ($\Theta$) with a spatially-resolving and energy-resolving detector in the Y-Z plane, determining the momentum transfer from the geometric data of the radioscopy unit for different angles of scatter ($\Theta$), and combining respective diffraction profiles belonging to different angles of scatter ($\Theta$) to produce a total-diffraction profile.

8 Claims, 2 Drawing Sheets

METHOD OF MEASURING THE MOMENTUM TRANSFER SPECTRUM OF ELASTICALLY SCATTERED X-RAY QUANTA

CROSS REFERENCE TO RELATED APPLICATIONS

This Application claims the benefit of priority of Federal Republic of Germany Patent Application No.: 102004060609.9, filed Dec. 16, 2004, which is hereby incorporated by reference in its entirety.

BACKGROUND OF THE INVENTION

This invention relates generally to a method of measuring the momentum transfer spectrum of elastically scattered X-ray quanta by means of which it can be concluded on which material the X-ray quantum was elastically scattered.

An apparatus for the examination of items of luggage is described in EP 1 241 470 B1. Such an apparatus has a focus extended in Y-direction which emits X-radiation in the X-direction. Through a primary collimator extending in the Y-direction only X-ray quanta which are aimed at an individual isocentre are allowed through into an examination area lying behind the isocentre. The isocentre forms the originating point of a Cartesian coordinates system and a disk-shaped inverted fan beam is thus formed. A scatter collimator which is developed annularly about the Z-direction is arranged between the isocentre and the examination area. The result is that only scattered radiation from an object located in the examination which emanates from the scatter voxel at a fixed preset angle of scatter is allowed through. A detector which extends along the Z-axis is arranged in the Y-Z plane. Depth information regarding the scatter voxel, i.e. its X-coordinate, is thereby imaged onto a parallel of the Y-axis in the Y-Z plane. By means of such an arrangement a rapid analysis of an item of luggage can be achieved, with only a one-dimensional movement of the item of luggage along the Z-direction on a conveyor belt having to take place. The scanning speed is, however, limited by the angle-dependent sensitivity of the detector elements.

Attempts have been made to replace the detectors arranged merely in Z-direction with a detector array, located in the Y-Z plane, consisting of a series of detector elements. Due to geometric imaging conditions the scatter quanta of a scatter voxel are always imaged onto elliptical structures in the Y-Z plane. By integrating the scatter quanta in the associated detector elements a greater yield and thus a faster recording of the material at the location of the scatter voxel takes place. Alternatively, a better signal-to-noise ratio is obtained for the momentum transfer spectrum. It has been found that with such apparatus only those methods belonging to a single fixed, preset angle of scatter can be carried out. However, depending on the material density in the item of luggage to be examined, the energy of the photon, and thus of the angle of scatter, can be varied while the momentum transfer function remains unchanged. Accordingly, a compromise is to be found for the examined angle of scatter.

BRIEF DESCRIPTION OF THE INVENTION

A method of measuring a momentum transfer spectrum of elastically scattered X-ray quanta which emanate from a scatter voxel inside an object to be examined is described. The scatter voxel is located in a radioscopy unit which has an anode extended in a Y-direction with a plurality of focus points. The scatter voxel emits X-radiation in an X-direction and has a primary collimator which allows through only primary radiation aimed at a single isocentre at the origin of a Cartesian coordinates system. A scatter collimator is arranged between the examination area and the isocentre and allows through only scatter quanta, from the object. The X-ray quanta are emitted at an angle of scatter ($\Theta$) with a constant Z-component ($\Theta_Z$), wherein the scatter collimator includes a detector. The X-component of a scatter voxel of the object is imaged onto the Z-component of the detector. The method includes simultaneous recording of the energy spectrum of scatter quanta from the scatter voxel at different angles of scatter ($\Theta$) with a spatially-resolving and energy-resolving detector in the Y-Z plane, determining the momentum transfer, that is the diffraction profile of the scatter voxel, from the geometric data of the radioscopy unit for the different angles of scatter ($\Theta$), and combining the respective diffraction profiles that belong to different angles of scatter ($\Theta$) to produce a total-diffraction profile.

DETAILED DESCRIPTION OF THE INVENTION

Figure 1:
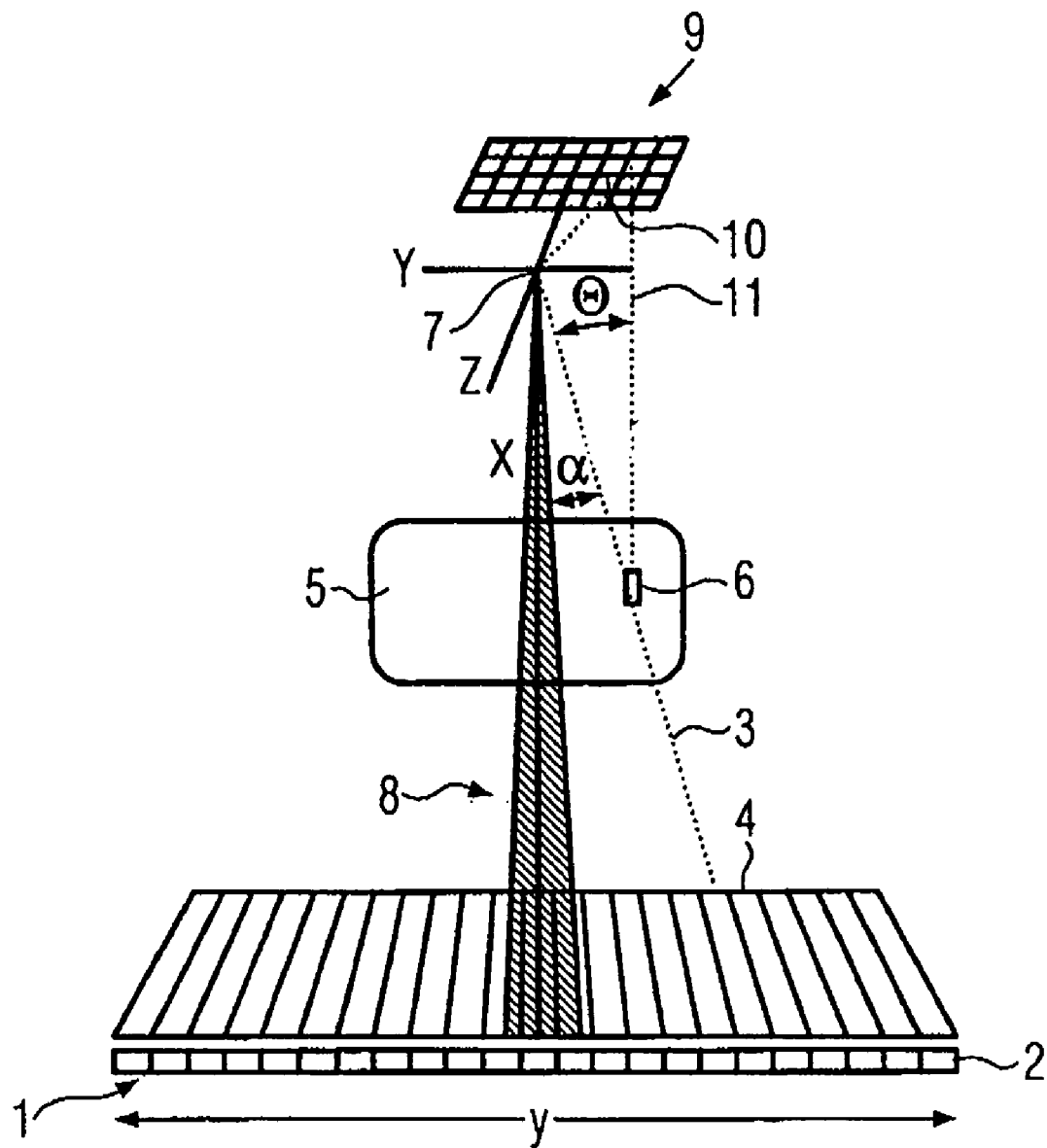
FIG. 1 is a schematic view of an apparatus according to one embodiment of the invention that does not include secondary collimators.

An embodiment of an apparatus according to the invention is schematically represented in FIG. 1 in which a section along the X-Y plane is shown. The apparatus according to the invention is represented in perspective at the top, i.e. in the region of the Y-Z plane.

The apparatus according to an exemplary embodiment of the invention has an anode 1 extending in the Y-direction which has a series of horizontally ranged discrete focus points 2 that move along anode 1 when fired upon by an electron beam. A number of focus points 2 are provided in an area (for reasons of clarity, only a small number of these focus points 2 are represented). The X-ray quanta emanating from each individual focus point 2 are bound by a primary collimator 4 having a fan shape, so that an inverted fan beam 8 of X-ray quanta results as primary beam 3. This inverted fan beam 8 runs in the X-Y plane and converges on a single isocentre 7 which simultaneously forms the coordinates source of a Cartesian coordinates system.

The primary beam 3 strikes an object 5 in the object area. In one embodiment, the apparatus is a luggage examination apparatus and object 5 is a suitcase. Object 5 lies on a conveyor belt (not shown) which can be moved along the Z-axis. As long as object 5 is not moved along the Z-axis by the conveyor belt, the inverted fan beam 8 passes through the object 5 along a thin slice in the X-Y plane. This slice is changed by a one-dimensional movement of the conveyor belt in the Z-direction, so that a complete scanning of object 5 is carried out through a movement of the conveyor belt.

The momentarily scanned thin slice includes of a number of scatter voxels 6, each of which has an X-coordinate (varying depth along the X-direction) and a Y-coordinate (varying lateral arrangement with regard to the X-axis). At each individual scatter voxel 6, primary beam 3 of X-ray quanta is scattered. Of the X-ray quanta scattered at this scatter voxel 6, only the coherently scattered X-ray quanta are of interest within the framework of the present invention. These are imaged into the Y-Z plane by means of a scatter collimator 13, not represented but described in EP 1 241 470 B1, so that, from its position along the Z-axis, there is a direct allocation to the depth along the X-direction in object 5. This means that only those X-ray quanta scattered at scatter voxel 6 which have a preset constant Z-component $\Theta_z$ of the angle of scatter $\Theta$ are allowed through by scatter collimator 13 as scatter quanta 11. The scatter quanta 11 allowed through are represented by a dotted line in FIG. 1.

Due to the scatter collimator being developed annularly about the Z-direction, not only scatter quanta in the X-Z plane pass through the scatter collimator but also those which have a coordinate other than Y=0. These scatter quanta are recorded by a two-dimensional detector 9 arranged in the Y-Z plane. The detector arrangement known from EP 1 241 470 B1 extends only along the Z-axis, but the individual detector elements 10 according to the exemplary embodiment of the invention also extend in Y-direction. This is a pixellated detector which is constructed as described above. More scatter quanta 11 of the scatter beam emanating from scatter voxel 6 which are allowed through by the scatter collimator 13 and have a fixed Z-component $\Theta_Z$ of the angle of scatter $\Theta$ can thereby be recorded by the detector 9. The more scatter quanta 11 that are recorded, the less time it takes to record the momentum transfer spectrum of the elastically scattered X-ray quanta.

Detector 9 is a detector array which is arranged in the Y-Z plane. Detector 9 is arranged at a distance from the Y-axis and the distance is chosen so that scatter beams 11 stemming from scatter voxel 6 strike it at an angle of scatter $\Theta$ less than 10°. This narrow forward angle in the elastic scatter is used, for example with explosives as object 5, as the momentum transfer function displays since a distinct peak decreases markedly for larger angles of scatter $\Theta$. Detector 9 includes a plurality of individual detector elements 10 forming a detector array. Each individual detector element 10 can be read out independently and is energy-resolving. In addition the momentum transfer function is allocated along the Y-axis for each individual scatter voxel 6, whatever its depth (X-coordinate display) in object 5. A larger solid angle is thereby obtained for which the elastically scattered X-ray quanta belonging to the scatter voxel 6 in question can be detected. More scatter quanta 11 are thereby detected than would be the case if only detector elements 10 were arranged along the Z-axis. The result is thus either a better resolution due to increased signal-to-noise ratio, or a significantly shortened scanning time of object 5 with a signal-to-noise ratio that is unchanged compared to the state of the art.

Due to the imaging geometry, detector elements 10 allocated to a scatter voxel 6 travel on an elliptical path which runs symmetrically to the Z-axis and aligns itself to the Y-axis as the distance from the Z-axis increases. However, the shape of the ellipse depends not only on the depth of scatter voxel 6 inside object 5, i.e. on its X-coordinate, but also on the primary beam emission angle $\alpha$ which scatter voxel 6 forms with the X-axis. The relationship between the diffraction profile which is defined by the momentum transfer x and the energy spectrum results in the equation:

$$x = \frac{E \cdot \sin(\Theta/2)}{hc}$$

The angle of scatter $\Theta$ is composed of two components: a Z-portion and a Y-portion. Due to geometric considerations the value of the momentum transfer x also depends on the primary beam emission angle $\alpha$ which strikes scatter voxel 6.

Scatter voxel 6 has the coordinates $(X_S, Y_S, 0)$. Due to the disk-shaped transillumination of inverted fan beam 8, the Z-coordinate of scatter voxel 6 always equals zero. The angle of scatter $\Theta$ can then be determined from the elementary geometric ratios for each individual scatter voxel 6 at each position of the primary beam 3. Thus the proper calculation of the momentum transfer spectrum x for each individual scatter voxel 6 can be determined.

On the basis of the equation given above, a small angle of scatter $\Theta$ correlates with a high photon energy when the constant momentum transfer x is constant. Such small angles of scatter $\Theta$ are advantageous for objects 5 with a high density, as they require photons which display a high energy in order that an adequate irradiation can take place. However, the scatter signal increases markedly for larger angles of scatter $\Theta$ with constant peak resolution in the diffraction profile. For objects 5 which display only a low density or a relatively high transparency, it is therefore more advantageous to examine these at larger angles of scatter $\Theta$.

Figure 2:
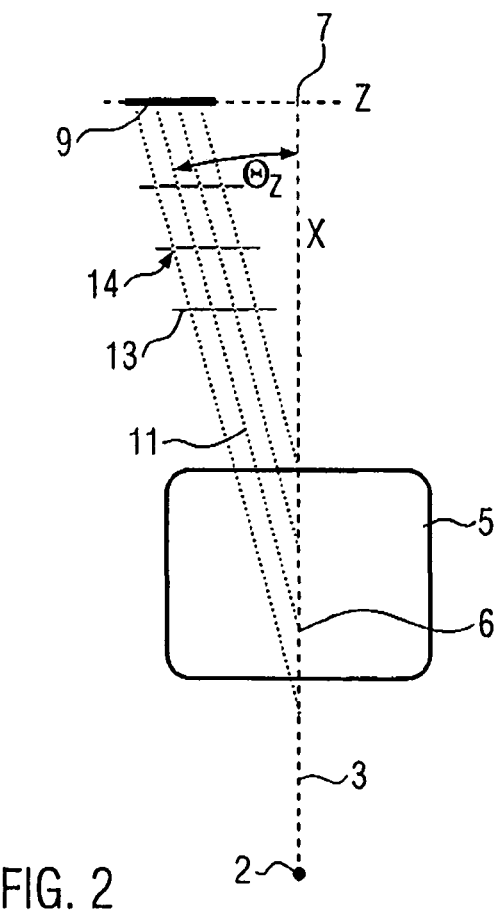
FIG. 2 is a longitudinal section through the apparatus shown in FIG. 1 along the X-Z plane with scatter collimators, and without a primary collimator.

In FIG. 2 a scatter collimator 13 is represented with which such an examination is possible and a method according to the invention can be carried out. Scatter collimator 13 includes three plates arranged parallel to each other which run parallel to the Y-Z plane and which each have four longitudinal slits 14 (any other number is equally possible) parallel to the Y-axis. The longitudinal slits 14 are arranged such that only scatter quanta 11 which have a constant Z-component $\Theta_Z$ of the angle of scatter $\Theta$ enter detector 9. This applies irrespective of the depth (X-coordinate) of scatter voxel 6 in object 5. As scatter quanta 11 leave the scatter voxel 6 not only in the Z-direction, but also along the whole of longitudinal slit 14, an entire series of detector elements 10 which run parallel to the Y-axis are struck by scatter quanta which emanate from the scatter voxel 6. Due to general geometric relationships the total angle of scatter $\Theta$ is composed of the two components $\Theta_Y$ and $\Theta_Z$. $\Theta_Z$ is represented in FIG. 2 and is the projection of the total angle of scatter $\Theta$ onto the X-Z plane. The other component $\Theta_Y$ is the non-represented projection of the total angle of scatter $\Theta$ onto the X-Y plane. As angles of scatter $\Theta$ in the range below 0.07 rad are measured, the small-angle approximation results in the following:

$$\Theta = \sqrt{(\Theta_Z^2 + \Theta_Y^2)}$$

As a result the angle of scatter $\Theta$ varies along the series of struck detector elements 10.

Figure 3:
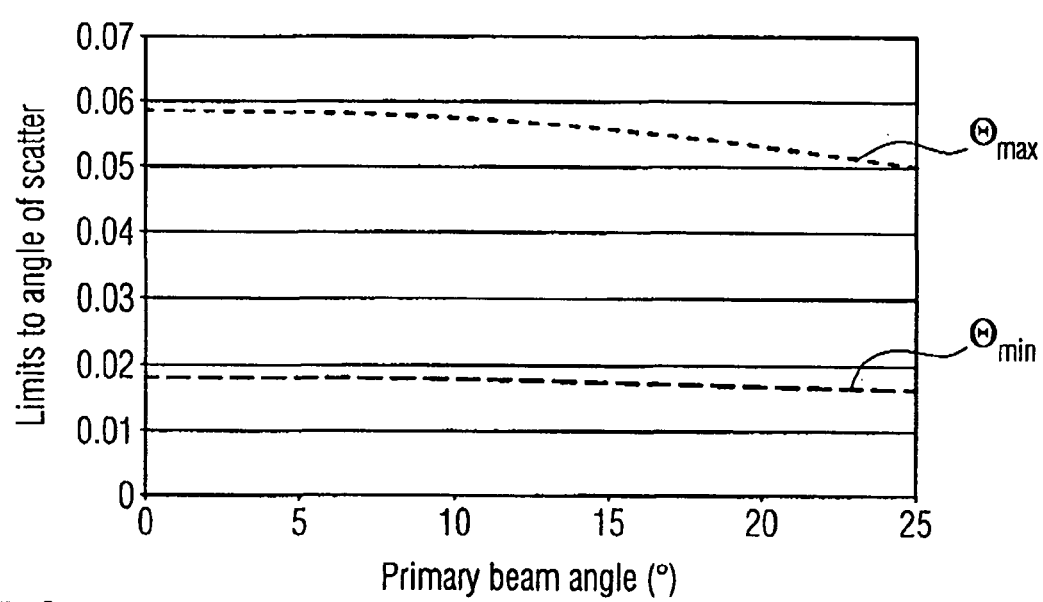
FIG. 3 is a diagram in which the minimum and maximum angles of scatter are plotted against the primary beam emission angle.

FIG. 3 illustrates a diagram in which the variation of the minimum angle of scatter $\Theta_{min}$ and of the maximum angle of scatter $\Theta_{max}$ are plotted against the primary beam emission angle $\alpha$. These correspond to scatter quanta 11 from scatter voxel 6 to the centre of detector 9 along the Z-axis (Y-component equals zero) and the end of the line of detector elements 10, i.e. the maximum half-extension of detector 9 in the Y-direction. In FIG. 3 the starting point is a detector width of 100 mm in the Y-direction, assuming the height of the entire arrangement, i.e. from the focus point 2 to the isocentre 7 (in FIG. 2) is 1800 mm and the aperture angle of the inverted fan beams 8 is ±25°. According to the state of the art a compromise would have to be found for the angle of scatter Θ, which lies at approx. 0.0368 rad. However, the curves for $Θ_{min}$ and $Θ_{max}$ run almost parallel over a broad area of the primary beam emission angle α. Only for larger emission angles α, i.e., above 10°, does the curve for the maximum angle of scatter $η_{max}$ fall faster than for the minimum angle of scatter $Θ_{min}$. However, the value of the maximum angle of scatter $Θ_{max}$ itself still remains at approx. 0.05 rad even for a primary beam emission angle α of 25°.

As the primary beam emission angle a can be determined on the basis of the chronological sequence of focus points 2, $Y_S$ can be determined if $X_S$ is known. $X_S$ can be determined on the basis of the geometric conditions according to FIG. 2 by the equation:

$$X_S = \frac{Z_D}{\tan Θ_Z}$$

$Z_D$ is the Z-coordinate of the detector element 10 which has been struck by the scatter quantum 11 of the scatter voxel 6 and $Θ_Z$ is the projection, already given above, of the total angle of scatter Θ onto the X-Z plane.

As a result the total angle of scatter Θ can be determined on the basis of knowing the coordinates of the scatter voxel 6 ($X_S$, $Y_S$, 0) and the coordinates of the detector element (0, $Y_D$, $Z_D$). If this angle of scatter Θ is introduced into the equation given above for the momentum transfer x with known photon energy, the proper momentum transfer x is assigned to the angle of scatter Θ in question. Thus it is possible to determine the momentum transfer x for different angles of scatter Θ with the same arrangement within the framework of a single scanning process. Depending on whether the just-examined scatter voxel 6 is an area of high or low density, the information for the momentum transfer either for large or small angles of scatter Θ can thereby be used. A better signal-to-noise ratio is achieved and an increase in the measurement speed with a constant output of the X-ray tubes is also achieved.

Diffraction profiles which have been recorded in detector elements 10 which are arranged in a line and chart scatter quanta 11 from the same scatter voxel 6 can either be directly overlaid, in order to achieve an even better signal-to-noise ratio, or can be overlaid after a weighting. The number of photons in the spectrum for detector element 10 in question can be used as a weighting index, so that those diffraction profiles receive the greatest weighting in that zone which has the best signal-to-noise ratio. Additionally, the signals of adjacent detector elements 10 can be added up at large angles of scatter Θ without weighting, as the effect of the spatially small detector elements 10 on the angle resolution for such large angles of scatter Θ is very small in relation to the detected scatter quanta 11. As different detector elements 10 see scatter events with the optimum photon energy at different angles of scatter, the range of diffraction profiles which can be analyzed are increased by the energy-adaptive concept according to the invention.

In the embodiment represented, the energy-adaptive concept has been represented and described for a scatter collimator 13 which images lines of scatter voxels 6 onto lines of detector elements 10. However, it is equally possible to use the concept according to the invention with other forms of scatter collimators 13. The energy-adaptive concept according to one embodiment of the invention, that scatter quanta 11 of a specific scatter voxel 6 are simultaneously recorded at different angles of scatter Θ, and the corrected diffraction profiles can be added up by means of different weighting methods to produce a combined diffraction profile, thus does not depend on a special geometry of scatter collimator 13.

As explained above, because the energy spectrum of scattered X-ray quanta from the scatter voxel is simultaneously recorded at different angles of scatter, a significantly higher yield of scatter quanta which are relevant for the evaluation can be recorded in the detector in the same scanning time. Due to the spatially-resolving and energy-resolving detector elements, conclusions can be drawn in connection with the geometric data of the radioscopy unit concerning the relationships between the obtained angle of scatter and the diffraction profile of the associated scatter voxel. In order to determine the material which is present at the location of the scatter voxel, the diffraction profile created at angles of scatter with a constant Z-component is produced with the help of the associated detector elements and the measured scatter quanta. Accordingly, with the help of the known geometric imaging conditions, the diffraction profile for another angle of scatter, such as the scatter quanta which are detected in another arrangement of detector elements, is determined for the same scatter voxel.

Thus it is possible to determine the diffraction profiles and also the momentum transfer for different angles of scatter, for a scatter voxel. It is also possible, in the same time as previously had to be expended to examine a single angle of scatter, to obtain a variation in the angle of scatter and thus to use the optimum angle of scatter for the determination of the material in the scatter voxel. This means that a small angle of scatter is advantageous if the scatter voxel examined has a high density and a large angle of scatter is preferred if the scatter voxel has a low density. Because the detector is developed as a two-dimensional pixellated detector, scatter quanta can not only be recorded along the Z-axis, but spatially resolved over a larger solid angle. As used above, a pixellated detector is a detector array which has individual detector elements which, independently of each other, record the striking of scattered radiation. This could be either a single crystal or several spatially separated detector elements. Each individual detector element can have a read-out chip. By recording scatter quanta which also strike the detector alongside the Z-axis, a larger solid angle can be covered and the signal-to-noise ratio is increased, or a shorter scanning time is obtained for the object than is possible with an arrangement according to the state of the art cited above.

In addition, lines of the object to be examined are imaged via a suitable scatter collimator onto lines of detector elements. This is possible since the extension of the whole detector in Y-direction is small, so that there are only relatively small angle portions in the Y-direction of the whole angle of scatter over the whole variation in length of the detector in the Y-direction. In this case there is an imaging of a line of the object to be examined almost onto a straight line. This is also the approximation of an ellipse for a small extension.

In one embodiment, the scatter collimator is formed from steel plates which run parallel to the Y-axis and are inclined at a preset angle of scatter to the X-Y plane. Alternatively, the scatter collimator is formed from longitudinal slits arranged one above the other in X-direction, which extend in the Y-direction and allow through only scattered X-ray quanta which emanate from the scatter voxel at a preset angle of scatter to the X-axis. These scatter collimators are very easily realized.

While the invention has been described in terms of various specific embodiments, those skilled in the art will recognize that the invention can be practiced with modification within the spirit and scope of the claims.

What is claimed is:

1. A method of measuring a momentum transfer spectrum of elastically scattered X-ray quanta which emanate from a scatter voxel inside an object to be examined, the scatter voxel is located in a radioscopy unit which has an anode extended in a Y-direction with a plurality of focus points, emits X-radiation in an X-direction and has a primary collimator which allows through only primary radiation aimed at a single isocentre at the origin of a Cartesian coordinates system, a scatter collimator is arranged between the examination area and the isocentre and allows through only scatter quanta, from the object, the X-ray quanta are emitted at an angle of scatter ($\Theta$) with a constant Z-component ($\Theta_z$), wherein the scatter collimator includes a detector, wherein the X-component of a scatter voxel of the object is imaged onto the Z-component of the detector, said method comprising:

simultaneous recording of the energy spectrum of scatter quanta from the scatter voxel at different angles of scatter ($\Theta$) with a spatially-resolving and energy-resolving detector in the Y-Z plane;

determining the momentum transfer, that is the diffraction profile of the scatter voxel, from the geometric data of the radioscopy unit for the different angles of scatter ($\Theta$);

applying a variable weighting to diffraction profiles such that a zone having a best signal-to-noise ratio receives a greatest weighting; and combining the respective diffraction profiles that belong to different angles of scatter ($\Theta$) to produce a total-diffraction profile.

2. A method according to claim 1 wherein the weighting occurs according to the number of photons measured in the respective detector element.

3. A method according to claim 1 wherein the weighting takes place according to the size of the angle of scatter ($\Theta$).

4. A method according to claim 3 wherein the diffraction profiles of adjacent detector elements are added up unweighted for large angles of scatter.

5. A method according to claim 1 wherein lines of the object to be examined are imaged via a suitable scatter collimator onto lines of detector elements.

6. A method according to claim 5 wherein the scatter collimator is formed from parallel steel plates which run parallel to the Y-axis and are inclined at a preset angle of scatter ($\Theta$) to the XY-plane.

7. A method according to claim 5 wherein the scatter collimator is formed from longitudinal slits arranged one above the other in the X-direction, which extend in the Y-direction and allow through only scattered X-ray quanta which emanate from the scatter voxel at a preset angle of scatter ($\Theta$) to the X-axis.

8. A method according to claim 1 wherein the weighting takes place depending on the primary beam emission angle ($\alpha$).

* * * * *